Aug. 30, 1955
F. E. HUTCHISON
2,716,493
MUD SCREENING DEVICE
Filed April 13, 1953
2 Sheets-Sheet 1
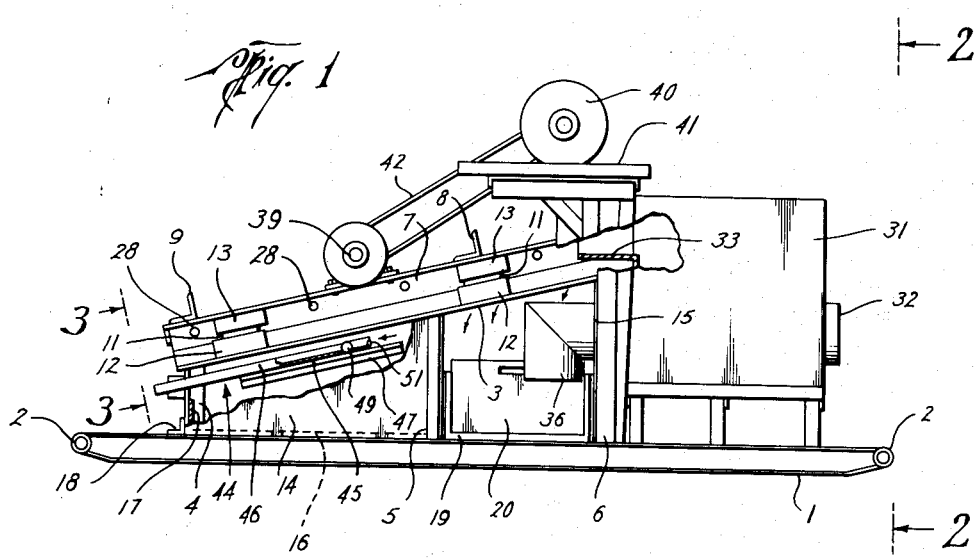
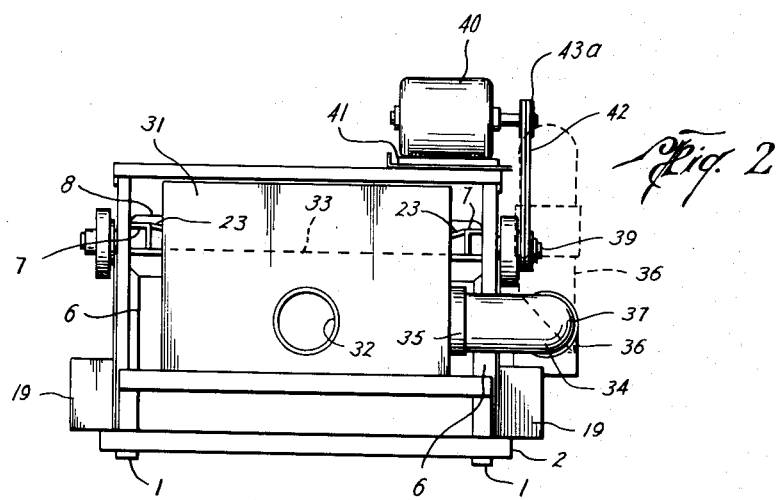
Frank E. Hutchison
INVENTOR.
BY
ATTORNEY Aug. 30, 1955          F. E. HUTCHISON           2,716,493
                       MUD SCREENING DEVICE
Filed April 13, 1953                          2 Sheets-Sheet 2
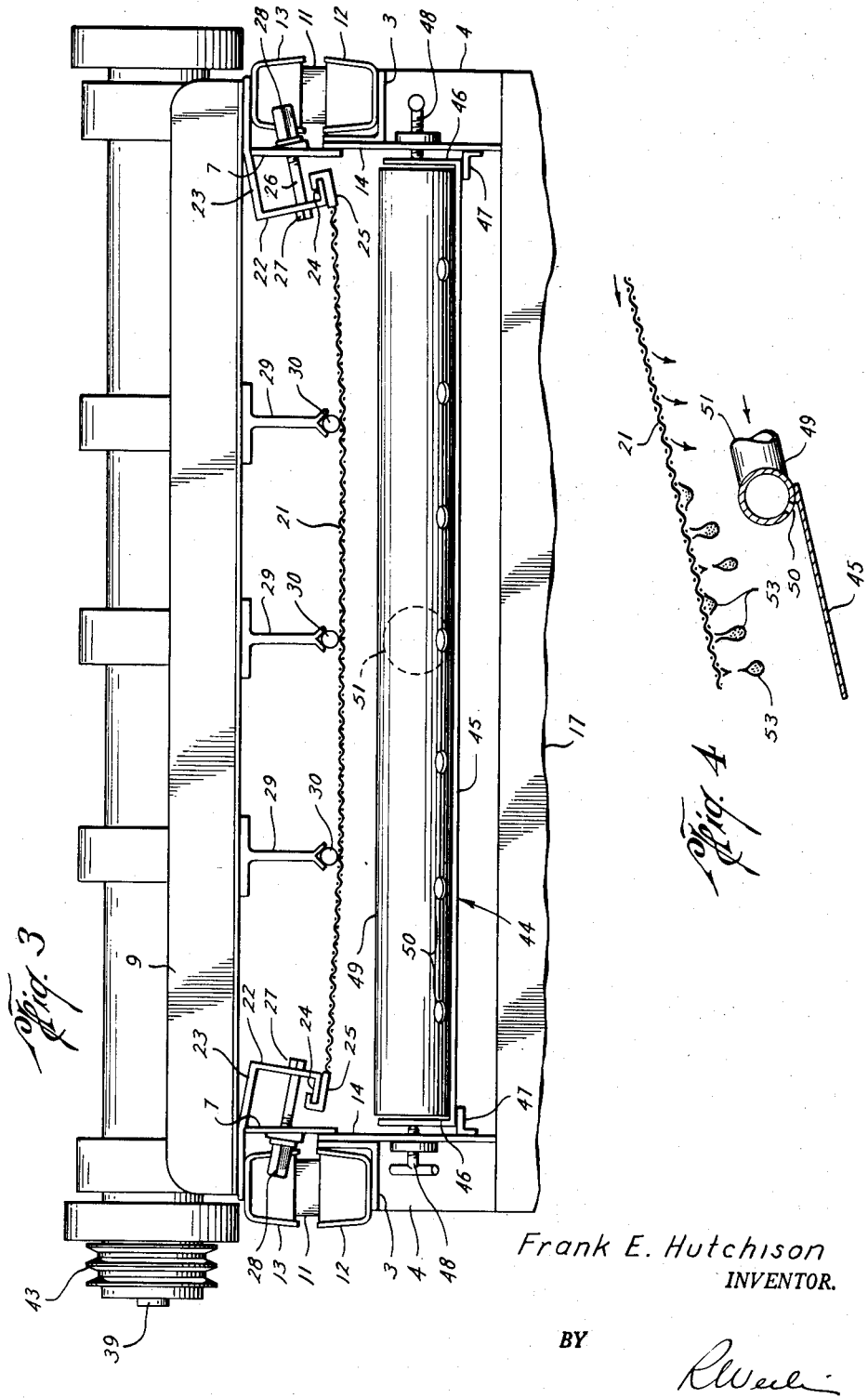
Frank E. Hutchison
       INVENTOR.
BY
       ATTORNEY

United States Patent Office 2,716,493
Patented Aug. 30, 1955

2,716,493

MUD SCREENING DEVICE

Frank E. Hutchison, Houston, Tex.

Application April 13, 1953, Serial No. 348,307

7 Claims. (Cl. 210—196)

This invention relates to a mud screen employed for removing foreign matter from well drilling fluids.

In the drilling of wells, particularly by the rotary method, a specialized drilling fluid, commonly called drilling mud, is circulated down into the well through a hollow drill pipe and thence back to the surface. The mud is employed to remove the drill cuttings from the vicinity of the bit back to the surface, to cool the bit, and to seal and consolidate the wall of the bore hole. At the surface the cuttings and foreign matter received by the drilling mud in passages through the well must be separated from the mud which is then returned to the well.

Screens of various types are commonly employed to separate the foreign matter from the mud and these are generally effective to remove the larger particles of foreign matter but considerable difficulty is encountered in removing the small particles of sand and other foreign matter which may often be of very minute particle size. Failure to effectively remove maximum quantities of these fine particles, which are often present in substantial quantities, may adversely affect the desired properties of the drilling fluid as by excessively increasing its viscosity or seriously altering its gel strength and thixotropic properties.

It is, therefore, a primary object of the present invention to provide an improved mud screen which will remove maximum quantities of the fine particles of sand and the like from the drilling fluid in an efficient and expeditious manner.

In conventional mud screening operations, the returning drilling fluid carrying drill cuttings and other foreign matter is discharged on to the upper face of an inclined vibrating screen, the meshes of which are normally sized to retain the larger particles of the cuttings and foreign matter, the fluid including the fines falling through the screen into a collecting tank or conduit for return to the circulating pumps.

A substantial quantity of the drilling fluid, by reason of its viscosity and surface tension, will form droplets which will ordinarily pendently adhere to the underside of the screen and will move downwardly along the undersurface of the screen while remaining attached thereto. The formation of the droplets will occur at various points along the screen depending in part upon the volume of fluid passing over the screen. It is found that the very fine sand particles and the like will accumulate in these droplets until the droplets become almost solid masses of such fines, particularly if the droplets are permitted to adhere to the underside of the screen as long as possible before being released therefrom by breaking of the adhesive bond either by mechanical action or by the accumulation of a sufficient mass of fines in the droplets.

Since it is ordinarily impractical to employ screens whose openings will be small enough to retain the very fine particles, the efficiency of separation of the fine particles will be dependent upon means which will assure maximum accumulation of the fines in the droplets followed by collection and removal of the concentrated droplets from the main body of the fluid falling through the screen.

In accordance with the present invention a mud screen construction is provided in which the screening element has its underside free of obstructions to the downward movement of the droplets and which includes a movable tray or trap which may be adjustably positioned longitudinally beneath the screen to catch the concentrated droplets at whatever points they may begin to accumulate or drop from the screen and which will prevent their return to the main body of fluid which has passed through the screen. Water spray means is also provided in conjunction with the movable tray to continuously flush off of the tray the masses of fines deposited thereon by the droplets.

Other objects and advantages of the present invention will become readily apparent from the following detailed description when read in conjunction with the accompanying drawing which illustrates a useful embodiment in accordance with the present invention.

In the drawing:

Fig. 1 is a side elevation, partly in section, of the improved mud screen in accordance with the present invention;

Fig. 2 is an elevational view of the rear end of the mud screen as viewed generally from line 2—2 of Fig. 1;

Fig. 3 is an enlarged front end elevation of the mud screen as viewed generally from line 3—3 of Fig. 1; and Fig. 4 is an enlarged fragmentary side view, partly in section, showing droplet formation on the screen and the relative position of the removable tray and wash pipe.

In the drawing, the numerals 1—1 designate spaced side members forming the base of the main frame of the screen structure. Side members 1—1 are rigidly secured together by means of a suitable number of tubular cross members 2—2.

There is an upper rectangular frame formed of side members 3—3 which decline forwardly and which are fixedly supported on side members 2—2 by front, intermediate and rear standards 4, 5 and 6, respectively. The side members 3—3 are preferably formed of angle iron with their flanges turned outwardly, as best seen in Fig. 3.

There is a screen frame formed of spaced apart angle iron side members 7—7 which are anchored together by upper and lower angle iron cross bars 8 and 9. The angle iron forming side members 7—7 is positioned with one flange extending horizontally outwardly and the other flange depending vertically as best seen in Fig. 3.

Between the horizontally extended flanges of side members 3 and 7 are pairs of longitudinally spaced resilient blocks 11—11 on opposite sides of the frames, which are seated in receptacles 12 carried by the side members 3 and over which are fitted the inverted caps 13 carried by the horizontal flanges on the side member 7. The screen frame is thus resiliently supported on the main frame.

There is a mud box supported by the framework having the side walls 14—14, the rear wall 15, the bottom 16, and the front wall 17 secured at its lower margin to the transverse angle 18 which is secured to the side members 1. This mud box is of substantially the same width and length as the main frame work and is suitably secured thereto. It has side discharge chutes 19—19 controlled by suitable gates 20—20 whereby the reclaimed mud may be delivered from the mud box to the mud pit for re-use.

It will be noted that the screen frame is mounted over the mud box so that liquid passing through the screen will fall into the mud box as indicated by the arrows in Fig. 1.

Beneath the screen frame, and anchored thereto, there is a screen 21 constructed of any suitable perforate material.

As best seen in Fig. 3, the side margins of screen 21 are secured to side tension bars 22—22 extending from end to end of the screen frame spaced laterally inwardly from side members 7 and rigidly secured along their upper margins to members 7 by means of spacer plates 23—23. Tension bars 22 are inclined downwardly and outwardly relative to the vertical flanges of member 7 and are provided along their free lower margins with outwardly turned lips 24—24 to which the side margins of screen 21 are locked by means of channeled rails 25—25.

Tension bolts 26 extend outwardly through holes in the webs of bars 22 and are provided on their inner ends with heads 27 which engage the sides of the webs. These bolts extend through holes in the depending flanges of side members 7 and have tension nuts 28 threaded on the outer ends thereof whereby the bolts may be placed under tension to pull tension bars 22 outwardly to regulate the tension on screen 21.

The screen frame is provided with a plurality of laterally spaced T-bars 29 extending longitudinally from end to end thereof and suitably secured thereto. The vertical legs of the T-bars depend from the upper end of the screen frame and their lower margins are provided with longitudinal channels to receive rods 30 constructed of resilient material which extend longitudinally from end to end of the screen frame. Screen 21 passes beneath rods 30 and, when under tension, is drawn tightly against the rods. The relative vertical dimensions of T-bars 29 and tension bars 22 are made such that screen 21 will assume a slight downwardly curved shape from side to side as seen in Fig. 3.

It will thus be observed that screen 21 declines forwardly from end to end of the screen frame and over the mud box and is completely unobstructed on its underside so that the drops of liquid formed in passing through the meshes of the screen and adhering to the underside thereof will move downwardly along the underside of the screen without meeting with any obstructions.

Mounted on the frame at the rear end thereof is a mud receiving chamber 31 having a mud inlet connection 32 adjacent its lower end through which mud returning from the well is delivered into chamber 31. A mud distributing flume 33 is mounted in the upper portion of chamber 31 and is arranged to deliver the mud to the upper end of screen 21.

A by-pass pipe 34 is connected into the side of chamber 31 near its lower end by means of a swivel connection 35. A riser pipe 36 is connected to the outer end of pipe 34 by an elbow 37. The length of riser pipe 36 is made such that when in vertical position its upper end will be above the level of flume 33 so that mud entering chamber 31 will necessarily flow through flume 33. However, when it is desired to by-pass the mud around the screen riser 36 the pipe 34 may be rotated downwardly in connection 35 so that the outer end of riser pipe 36 will be positioned over chute 19 and mud flowing into chamber 31 will discharge therefrom through pipe 34 and riser pipe 36 into chute 19.

Any suitable means may be employed to provide a vibratory drive for the screen frame. Such a drive is disclosed in my former U. S. Patent No. 2,408,558, issued October 1, 1946 and comprises a vibrator shaft 38 mounted transversely on the screen frame and suitably secured to side members 7 and T-bars 29. Shaft 39 is driven by a motor 40, mounted on a pedestal 41 supported in the main frame, and connected to shaft 39 by means of a driven belt 42 extending between a pulley 43 mounted on shaft 39 and a drive pulley 43a which is mounted on the drive shaft of motor 40. The screen drive mechanism and its details do not form a part of the present invention, and it will be understood that any suitable or generally conventional arrangement may be employed for effecting the desired vibratory movement of the screen frame.

As best seen in Figs. 1 and 3, a tray, designated generally by the numeral 44, composed of a flat bottom 45 and upstanding side walls 46—46 is mounted a short distance beneath screen 21 and over the mud box. Tray 44 is slidably mounted on rails 47—47 which are secured in forwardly inclined positions to the inner faces of side walls 14—14 of the mud box. The angle of inclination of the rails will preferably be the same as that of the screen frame, so that tray 44 will ordinarily be generally parallel to screen 21 although it may be inclined at a somewhat greater or even a somewhat lesser angle than the screen. It will be seen that the width of tray 44 will be somewhat greater than that of screen 21 so that any liquid falling through the portion of the screen overlaying tray 44 will fall thereon rather than into the mud box. The length of tray 44 will ordinarily be made somewhat less than that of screen 21 and will ordinarily be positioned along rails 47 so that the forward end of tray 44 will project forwardly beyond the forward end of the mud box. Fig. 1 illustrates the position of the tray as underlying the lower half of the screen. The rearward portion of the screen left uncovered by the tray may be varied by adjusting the position of the tray along rails 47. Set screws 48—48 extend through side walls 14 to releasably engage side walls 46 of the tray to thereby fix the longitudinally adjusted position of the tray as desired. A spray header 49 is mounted transversely on the upper surface of tray 44 adjacent its upper or rearward end and is provided with a plurality of laterally spaced discharge openings 50 directed downwardly and forwardly of the upper surface of tray 44. An inlet pipe 51 is connected to header 49 for supplying water thereto.

In operation, fluid returning from the well will be discharged from flume 33 on to the upper end of screen 21 and will pass through the openings in the screen into the mud box. The coarse particles of cuttings and foreign matter will pass down the screen and will be discharged from the lower end thereof beyond the forward end of the mud box. The fine sand particles and the like will pass through the screen openings with the liquid.

While a substantial portion of the liquid will pass directly through the screen, a substantial proportion of the liquid will form in drops 53 on the underside of the screen, as shown in Fig. 4, and will be retained suspended from the underside of the screen by adhesion thereto and will gradually move on down along the underside of the screen. These drops will assume a sack-like shape which shape will be preserved by the surface tension of the liquid and, as noted previously, it is found that the fine particles will collect in the drops until the drops become almost solid masses of fine particles. The mechanism of this action, while not fully understood, apparently is the result of some combination of adsorption, agglomeration and flotation action, and it is found that if the drops are permitted to remain attached to the screen until their increasing mass and density break the adhesive bonds to the screen, the maximum quantity of fines will accumulate in the drops. Accordingly, by employing the underslung type of screen above described which, as noted, has its underside entirely free of mechanical obstructions, the drops will be free to retain their attachment to the screen as long as possible.

It will be understood that drop formation will occur at various points along the underside of the screen, depending primarily upon the volume of fluid being delivered to the screen. It is highly desirable to prevent the return of the maximum quantity of fines-laden drops to the main body of fluid. Tray 44 provides means to intercept these drops which is longitudinally adjustable so that it may be positioned at any point along the screen where the drops begin to break loose from the screen. When the drops fall on the tray and deposit their masses of fines, insufficient fluid will ordinarily be present to flush the deposited masses from the tray. Water will be supplied to spray header 49 and will be sprayed over the surface of the tray to flush the deposited fines downwardly along the tray so that they will be discharged from the lower end of the tray beyond the confines of the mud box.

It will be seen that, although not all the fines will be removed from the drilling fluid, by the employment of the underslung type of screen in combination with the adjustable collecting tray and its wash pipe, maximum quantities of fines may be effectively and expeditiously removed from the drilling fluid.

It will be understood that various changes and modifications may be made in the details of the illustrative embodiment within the scope of the appended claims but without departing from the spirit of this invention.

What I claim and desire to secure by Letters Patent is:

1. In a drilling mud screening device of the vibratory type, the combination of an inclined screen having its lower surface substantially free of mechanical obstructions throughout its length, a liquid collecting tank disposed beneath the screen to receive the liquid portion of a drilling mud falling through the screen, and a movable tray member underlying the lower half of the screen positioned between the screen and the collecting tank and adjustable longitudinally relative to the screen to intercept the liquid falling through the overlying portion of the screen, said tray member being somewhat less in length than the screen and the forward end of the tray member projecting beyond the forward end of said tank arranged to discharge the intercepted liquid outside the confines of said tank.

2. In a drilling mud screening device of the vibratory type, the combination of an inclined screen having its lower surface substantially free of mechanical obstructions throughout its length, a liquid collecting tank disposed beneath the screen to receive the liquid portion of a drilling mud falling through the screen, a movable tray member underlying the lower half of the screen positioned between the screen and the collecting tank and adjustable longitudinally relative to the screen to intercept liquid falling through the overlying portion of the screen, said tray member being somewhat less in length than the screen and the forward end of the tray member projecting beyond the forward end of said tank arranged to discharge the intercepted liquid outside the confines of said tank, and spray means positioned on the tray member to discharge a wash liquid over the upper surface of the tray member.

3. In a drilling mud screening device of the vibratory type, the combination of an inclined screen of generally rectangular shape having its lower surface substantially free of mechanical obstructions throughout its length, a liquid collecting tank disposed beneath the screen to receive the liquid portion of a drilling mud falling through the screen, said tank having upstanding side walls and end walls, a pair of guide rails secured to the opposite side walls of the tank below the screen and inclined to substantially parallel the screen, a flat tray member of generally rectangular shape underlying the lower half of the screen slidably mounted on said rails and longitudinally adjustable thereon relative to the screen to intercept liquid falling through the overlying portion of the screen, said tray member being somewhat less in length than the screen and the forward end of the tray member projecting beyond the forward end of said tank arranged to discharge the intercepted liquid outside the confines of said tank, and spray means positioned on the tray member to discharge wash liquid over the upper surface of the tray member.

4. In a drilling mud screening device as defined by claim 3, releasable clamping means mounted on said tank and extending into clamping engagement with said tray member to retain said tray member in longitudinally adjusted position beneath said screen.

5. A drilling mud screening device, comprising, a stationary main frame, a generally rectangular forwardly inclined screen frame resiliently supported on the main frame for vibratory movement thereon, a generally rectangular screen dependingly supported from the screen frame to have its lower surface substantially free of mechanical obstructions throughout its length, a liquid collecting tank mounted on the main frame beneath the screen to receive the liquid portion of a drilling mud falling through the screen, a generally rectangular tray member mounted in the main frame to extend transversely and longitudinally of the main frame between said screen and said tank, said tray member underlying the lower half of the screen and being adjustable longitudinally relative to said screen to intercept liquid falling through the overlying portion of the screen, said tray member being somewhat less in length than the screen and the forward end of the tray member projecting beyond the forward end of the said tank and arranged to discharge the intercepted liquid outside the confines of said tank, and spray means positioned on the tray member to discharge a wash liquid over the upper surface of the tray member.

6. In a drilling mud screening device as defined by claim 5, releasable clamping means mounted on said tank and extending into clamping engagement with said tray member to retain said tray member in longitudinally adjusted position beneath said screen.

7. A drilling mud screening device as defined by claim 5, wherein said tray member has a substantially flat bottom and short upstanding side walls, and the forward end of the tray member being open for the discharge therefrom of said intercepted liquid.

References Cited in the file of this patent

UNITED STATES PATENTS 2,408,558 Hutchison Oct. 1, 1946